April 29, 1952  H. J. RUSSELL  2,595,101

MEASURING DEVICE FOR MERCURY AND POWDERED METAL

Filed March 2, 1950

INVENTOR.
HARRY J. RUSSELL
BY
ATTORNEY

Patented Apr. 29, 1952

2,595,101

UNITED STATES PATENT OFFICE 2,595,101

MEASURING DEVICE FOR MERCURY AND POWDERED METAL

Harry John Russell, Newark, N. J., assignor to Baker & Co., Inc., Newark, N. J., a corporation of New Jersey Application March 2, 1950, Serial No. 147,190

2 Claims. (Cl. 73—426)

The present invention relates to a measuring device for mercury and powdered metal and more particularly to a device for reproducing exact volumes of mercury and powdered metal.

Various dispenser devices have been proposed and utilized for measuring mercury and metal powders for subsequent mixing to form amalgams, for example, amalgams of mercury and silver powder alloys used in making dental fillings. Accurate proportioning of mercury and silver powder alloys to produce such dental amalgams is critical because it is necessary to assure proper setting time of the amalgam and to provide a finished amalgam of proper physical properties, which are dependent upon exact proportions of metal powder and mercury.

Dispenser devices for mercury and powdered metal are usually provided with enclosed discharge passages provided with mechanical means for ejecting established volumes. Such enclosed passages, or enclosed reservoirs associated therewith, for containing measured volumes, do not avoid the trapping of air during operation of the dispenser. The trapped air is especially disadvantageous because it prohibits the reservoirs from becoming completely filled before dispensing, which leads to an inaccuracy in the preparation of, for example, an amalgam of silver alloy powder and mercury. Also, manipulation of dispensing mechanisms often move a measured volume of mercury with a jarring effect so that some of the mercury dissociates from the coherent mass in the form of small droplets or splashings which cause inaccuraries in the amount of mercury delivered to a receptacle.

Figure 1:
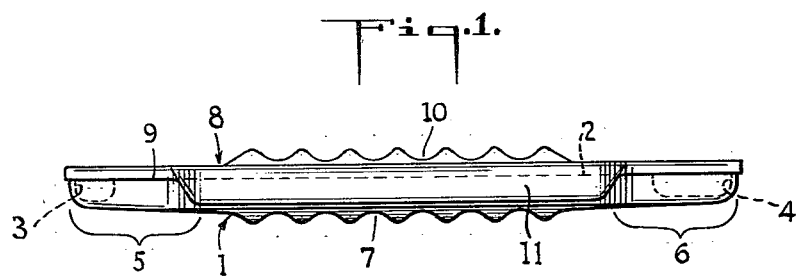
Figure 3:
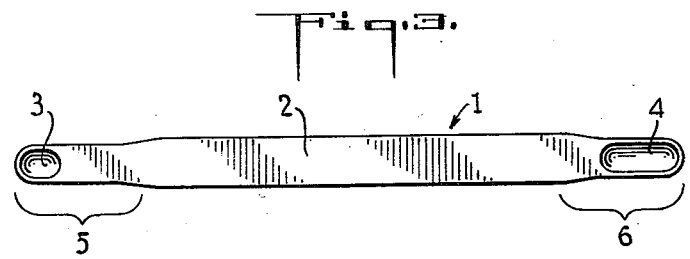
Figure 4:
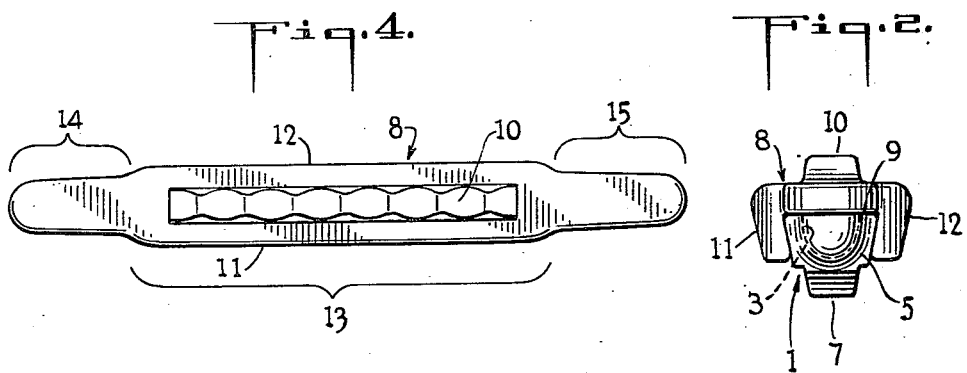
Figure 2:
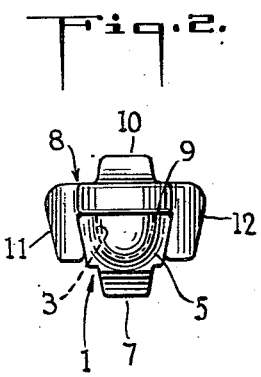
Figure 5:
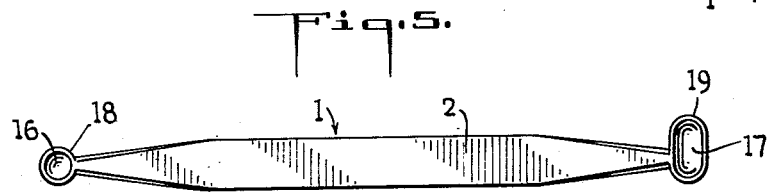

It is an object of the present invention to provide a measuring device, for mercury and powdered metal, which at all times delivers an exact volume to a receptacle. It is another object of the present invention to provide a measuring device for mercury and powdered metal whereby the trapping of air in the measuring reservoirs is avoided. It is a further object of the present invention to provide a measuring device for mercury and powdered metal whereby exact volumes are visibly ascertained before dispensing said volumes into a receptacle. Other objects and advantages of the present invention will become apparent from the decription hereinafter following and the drawings forming part hereof, in which:

Figure 1 illustrates a side view of a measuring device according to the present invention, Figure 2 illustrates an end view of a measuring device according to the present invention, Figure 3 illustrates a top view of the lower rod member shown in Figure 1, Figure 4 illustrates a top view of the upper member shown in Figure 1, and Figure 5 illustrates a top view of a modification of the present invention.

According to the invention, the measuring device is particularly adapted for the filling of a measuring reservoir with a quantity or volume of the substance to be measured while the reservoir is submerged into said substance, e. g. mercury, and thereby avoiding the admission of air into said reservoir. The device is further adapted for advantageous and time-saving transmittal of substances to be mixed, i. e. amalgamated, directly from the vessels containing them into a capsule in which the substances are mixed by a mechanical mixer. There is little possibility of even small errors in the proportions of the substances deposited into said capsule since before dispensing the exact volumes are visibly ascertained. The device is of simple construction, easily operable, and contains no mechanical moving parts such as are apt to become defective in operation and cause inaccuracies in the dispensing of desired volumes of substances, e. g. mercury and silver powder.

According to Figures 1 to 3 inclusive, I provide an elongated base structure which is preferably in the form of a rod 1 having a smooth or flat surface 2 parallel to its axis and either along its entire length or along a portion thereof from an extremity of the rod towards its middle. A depression or reservoir 3 is formed into the flat surface of said rod substantially at the end thereof and in the plane of the flat surface. In my preferred embodiment, I provide two such reservoirs, for example reservoirs 3 and 4, each associated with an end portion of the rod 1 as illustrated. One of said reservoirs, for example reservoir 3, is dimensioned for containing a measured volume of mercury, while the other reservoir, for example reservoir 4, is dimensioned for containing a measured volume of metal powder. The reservoirs are associated with each other so that one reservoir has a volume greater than the other to provide, for example, one part of metal powder to 1.6 parts of mercury by weight. The proportion of metal powder to mercury is so chosen that when mixed the resultant amalgam possesses an established setting time, a desired consistency for easy application to a tooth cavity, and proper physical characteristics in its hardened state.

Since the base structure or rod 1 is provided with reservoirs to be submerged into the amalgam constituents, the end portions 5 and 6 which are submerged with the reservoirs may be of smaller dimensions or narrower than the body portion of the rod so that there is little displacement of a constituent in the container from which said constituent is removed. The portions 5 and 6 are preferably smooth and rounded to inhibit adhesion of an amalgam constituent to the surface thereof. The main portion or body portion of the rod is preferably provided with a roughened surface or a gripping means 7 at a location other than that on which the flat surface is located, for example, opposite the flat surface, and the sides of said body portion are beveled downwardly and inwardly from said flat surface 2. Since mercury is one of the constituents to be measured and dispensed, it is to be understood that the material from which the base structure is manufactured is necessarily a material which has no affinity for mercury or is not wetted by said mercury, for example, a plastic material of the phenol formaldehyde type, methacrylate, Lucite, etc., or a ferrous metal characteristically non-wettable by mercury.

In combination with said base structure, I provide a slidable or moveable elongated member 8 according to Figure 5 and preferably made of a transparent material such, for example, as Lucite, glass, etc. The member 8 is provided with a flat undersurface which is formed, for example, machined and polished, to accurately correspond in flatness and smoothness with the surface 2 which it contacts in close fitting engagement along the plane 9 between the rod 1 and member 8. The member 8 may be provided with a roughened top surface or gripping means 10 and with sides 11 and 12 extending downwardly of the body portion 13.

The sides 11 and 12 are provided with beveled inner surfaces engageable in slidable close-fitting contact with the beveled sides of the rod 1 to maintain contact of the surface 2 and the undersurface of the member 8 along the plane 9 during movement of said member to form a tongue-groove guiding means. The guiding sides 11 and 12 may alternatively be formed as a mechanically equivalent means with inner projections to slide in grooves in the sides of the rod 1 (not shown) for slidable movement. End portions 14 and 15 of the member 8 are dimensioned so that their undersurfaces have an area at least that of the area of the flat surfaces of the end portions 5 and 6.

For operating the device, the thumb of the hand is placed on the gripping means 10 and the fingers on the gripping means 7. By manipulating the thumb, the member 8 is moved rearwardly of, for example, the reservoir 3 and the reservoir including the end portion 5 is submerged into mercury. While submerged, the thumb moves the end portion 14 toward and over the reservoir 3, which, while submerged, is completely filled with mercury and covered by the end portion 14 without the admission of air. When the device is removed from the mercury, it is visibly ascertained through the transparent end portion 14 of member 8 that the mercury completely fills the reservoir. The filling of the reservoir 4 with metal powder is accomplished in the same manner. Upon observation of the filled and covered reservoir 3, when removed from the supply of mercury, it will be seen through the transparent end portion 14 that the mercury in the reservoir completely fills the reservoir and has a top surface corresponding to the contour of the reservoir in the plane 9. Upon repeated filling and dispensing on a sensitive scale, it will be further ascertained that exact dispensed volumes are always reproducible. The same applies to the dispensed metal powder. Therefore, amalgams produced by mercury and metal powder measured and dispensed according to this invention will always have the desired properties. The device of the invention further assures accuracy by the fact that the device allows transmittal of the constituents without any loss thereof. In order to transmit the covered volumes of the constituents to, for example, a capsule in a mechanical mixer, it is only necessary to apply pressure upon the member 8 to prevent movement of said member before dispensing.

Figure 5 illustrates a modification of the present invention whereby reservoirs 16 and 17 are contained in substantially cup-like ends 18 and 19 of the rod 1 and at least one of said reservoirs being provided with a substantially oval shape having its larger diameter perpendicular to the rod 1 in the plane 9 to serve as a spout means. This modification provides for the dispensing of the volumes in the reservoirs into substantially small containers, e. g. capsules, without any spilling of the mercury or metal powder.

It is apparent that minor modifications of the present invention are possible without departing from the scope thereof.

What I claim is:

1. A measuring and dispensing device for mercury and powdered silver alloy in the manufacture of amalgam comprising a lower rod base member and an upper elongated movable member in slidable engagement therewith, said base member comprising a main body portion and narrower end portions extending longitudinally therefrom at each end thereof, a flat top planar surface extending throughout the length thereof, beveled side surfaces extending downwardly and inwardly from said top surface, oval cup-shaped reservoirs formed in the end portions of said base member with their openings being in the plane of the top surface, one of said reservoirs being dimensioned for containing a predetermined volume of mercury, said other reservoir being dimensioned to accommodate a predetermined volume of the powder silver alloy to be measured and dispensed, the undersurface of said base member at the main portion having a gripping means formed thereon, said upper movable member comprising a flat planar undersurface accurately corresponding in flatness and smoothness with its mating surface on the base member, main body portions and narrower end portions on said upper member corresponding with the similar portions on the base member, the narrower end portions on said upper member being made of transparent material and a gripping means formed on the upper surface of the main portion of said upper member, said movable member having side portions extending downwardly and inwardly therefrom at the main body portion thereof engageable in sliding contact with the beveled sides of said base member to maintain close contact of the undersurface of the upper member with the top surface of said base member and to allow for relative sliding movement of said two members along the plane of the base member top surface.

2. A measuring and dispensing device according to claim 1 wherein one of the oval-shaped reservoirs has its largest diameter arranged perpendicular to the longitudinal axis of said base member.

HARRY JOHN RUSSELL.

REFERENCES CITED

The following references are of record in the file of this patent:

UNITED STATES PATENTS

| Number | Name | Date |
| --- | --- | --- |
| D. 92,138 | Thompson | May 1, 1934 |
| 353,055 | Dorr | Nov. 23, 1886 |
| 2,034,733 | Wilkins | Mar. 24, 1936 |
| 2,389,530 | Miner | Nov. 20, 1945 |